United States Patent
Ishida

(10) Patent No.: US 7,011,312 B2
(45) Date of Patent: Mar. 14, 2006

(54) GLAND PACKING AND SEALING APPARATUS COMPRISING IT

(75) Inventor: Makoto Ishida, Gojo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 10/490,475

(22) PCT Filed: Sep. 24, 2002

(86) PCT No.: PCT/JP02/09787

§ 371 (c)(1),
(2), (4) Date: Mar. 24, 2004

(87) PCT Pub. No.: WO03/027546

PCT Pub. Date: Apr. 3, 2003

(65) Prior Publication Data
US 2004/0251635 A1  Dec. 16, 2004

(30) Foreign Application Priority Data
Sep. 26, 2001 (JP) .............................. 2001-294866

(51) Int. Cl.
*E21B 33/128* (2006.01)

(52) U.S. Cl. ...................... 277/342; 277/337; 277/339; 277/341

(58) Field of Classification Search ................ 277/337, 277/339, 341, 342
See application file for complete search history.

(56) References Cited

U.S. PATENT DOCUMENTS

| 2,400,533 | A | * | 5/1946 | Buffington ................. 264/137 |
| 4,328,974 | A | | 5/1982 | White et al. |
| 5,165,703 | A | | 11/1992 | Morvant |
| 5,476,271 | A | | 12/1995 | Hatting et al. |

FOREIGN PATENT DOCUMENTS

| DE | 7258 | 4/1879 |
| DE | 27 22 754 | 11/1978 |
| GB | 408870 | 4/1934 |

* cited by examiner

*Primary Examiner*—Enoch Peavey
(74) *Attorney, Agent, or Firm*—Roylance, Abrams, Berdo & Goodman, L.L.P.

(57) ABSTRACT

To provide a novel gland packing and a sealing apparatus comprising this, wherein the gland packing displays high and stable sealability for a stem and an inner wall surface of a stuffing box even for uses further requesting the movability (rotation and reciprocating movement), and further, gives excellent effects, such as decrease of moving resistance of a stem, shape stability, adaptability to a corroded and worn-out stem and stuffing box, function for receiving shafts, easiness of equipment, simplification of sealing structure, and compactness of a sealing apparatus. The gland packing, according to the present invention, is a ring packing of which the cross sectional shape is a quadrilateral, wherein both two edges at inner and outer diameter sides of the quadrilateral are parallel to a central axis of the gland packing, and wherein the other two edges have slopes of the same orientation as to an axis perpendicular to the central axis, with the gland packing being characterized in that an inner-diameter-side acute angle portion and an outer-diameter-side acute angle portion of the quadrilateral are made flat portions.

17 Claims, 16 Drawing Sheets

[Fig.1]
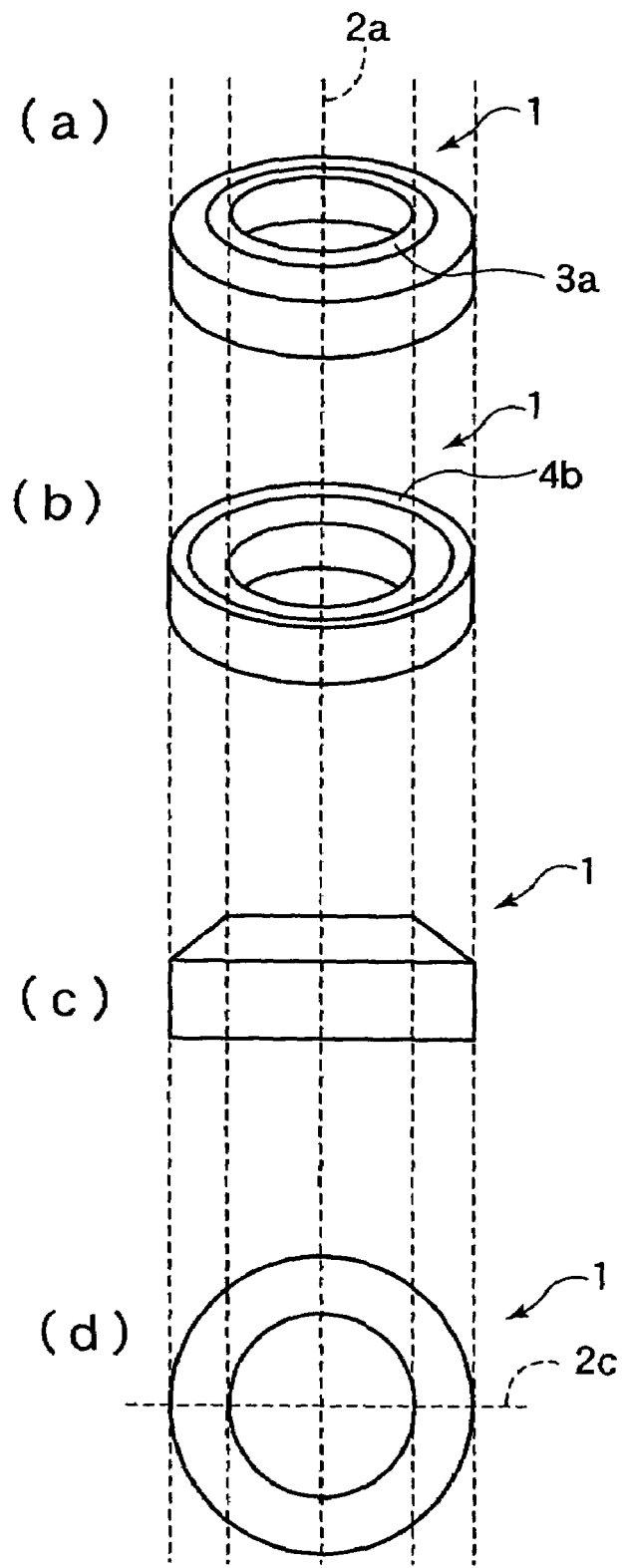

[Fig.2]
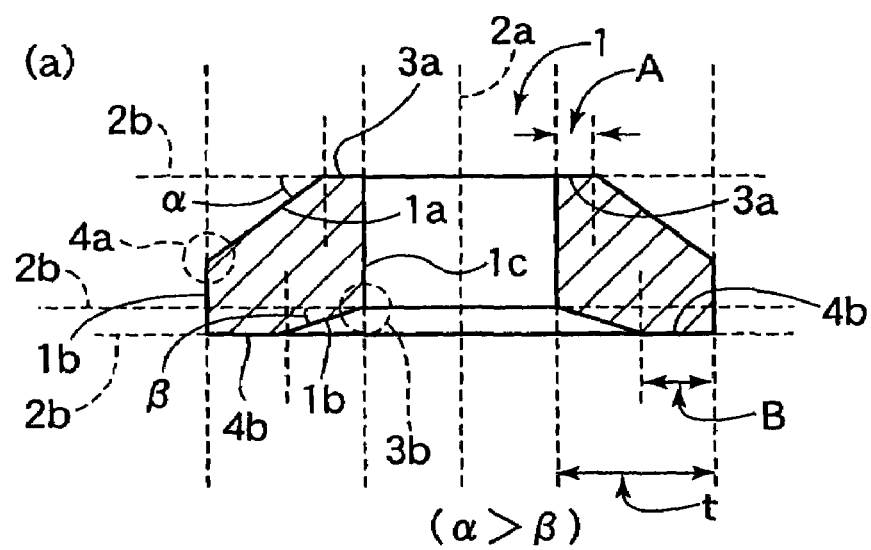
(a) ($\alpha > \beta$)
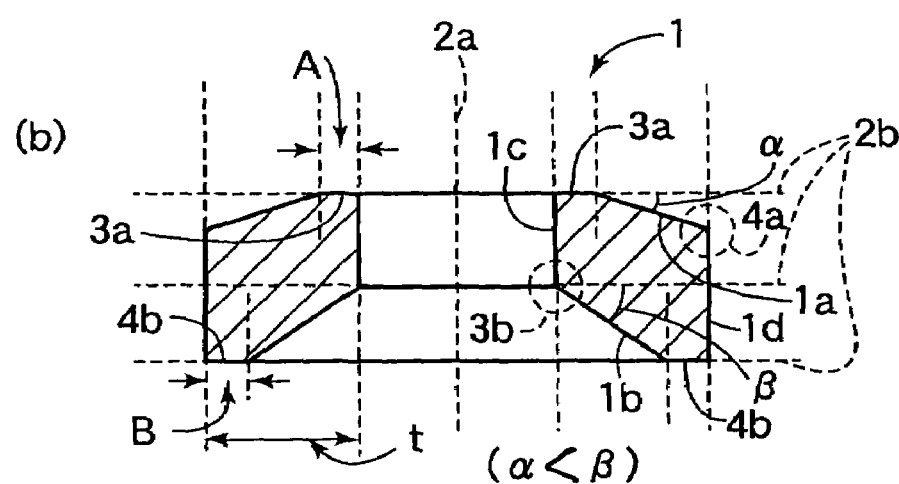
(b) ($\alpha < \beta$)

[Fig.3]
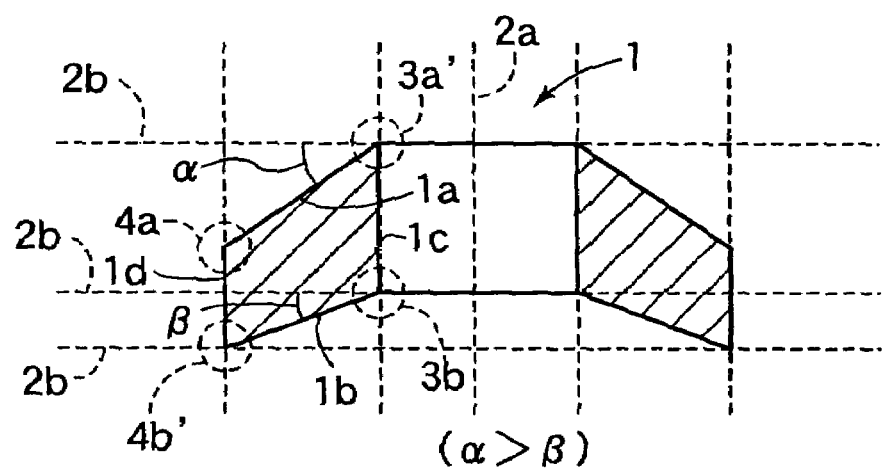

[Fig.4]
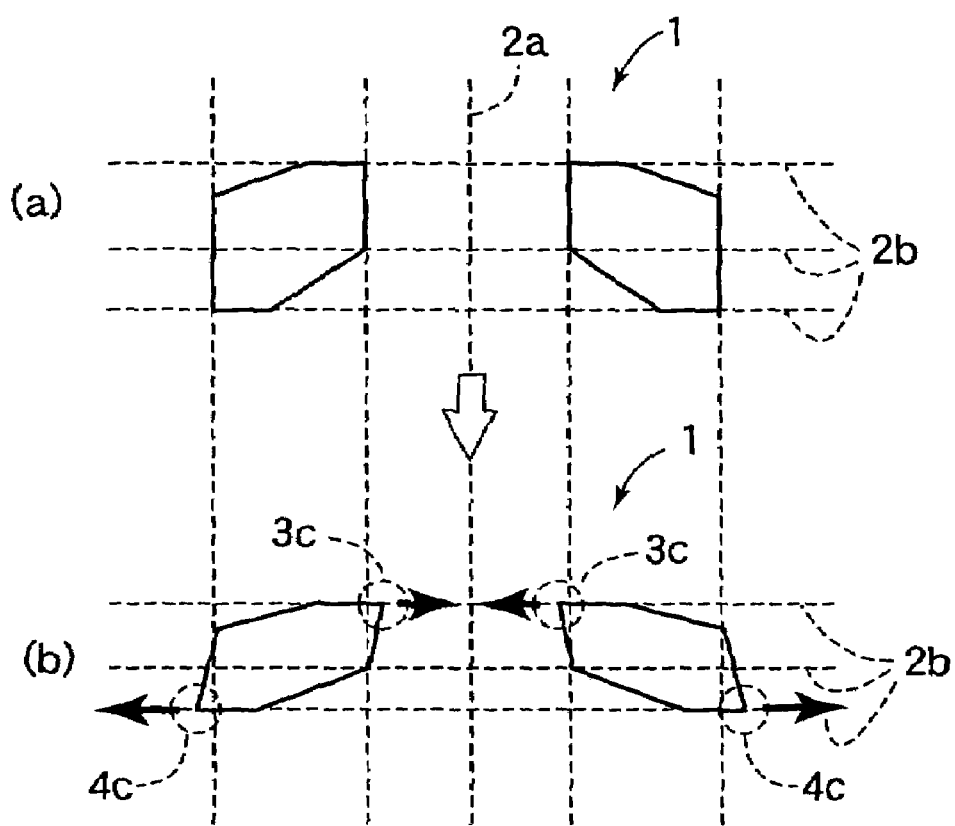

[Fig.5]
(a)
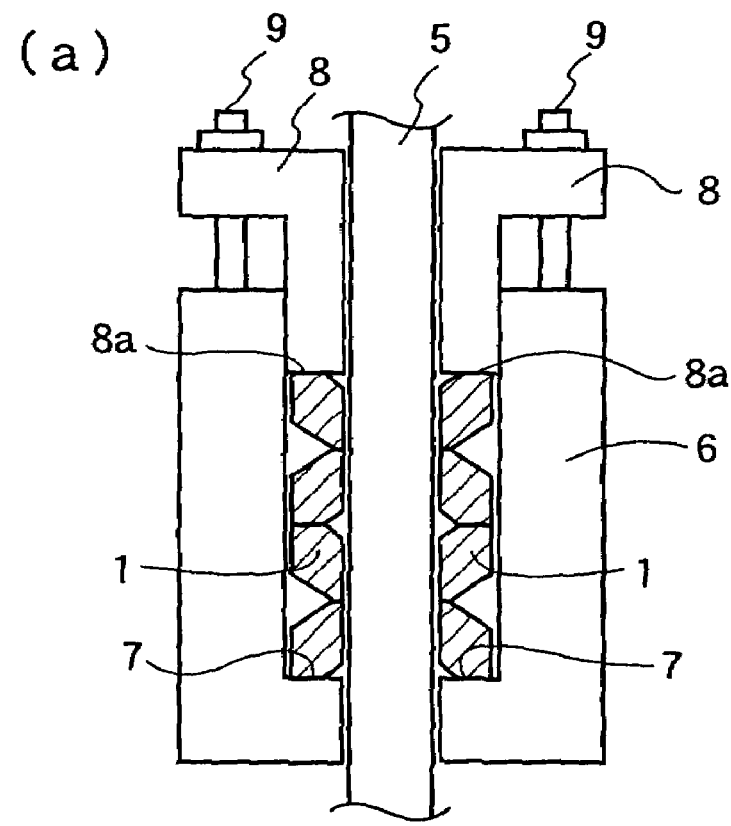
(b)
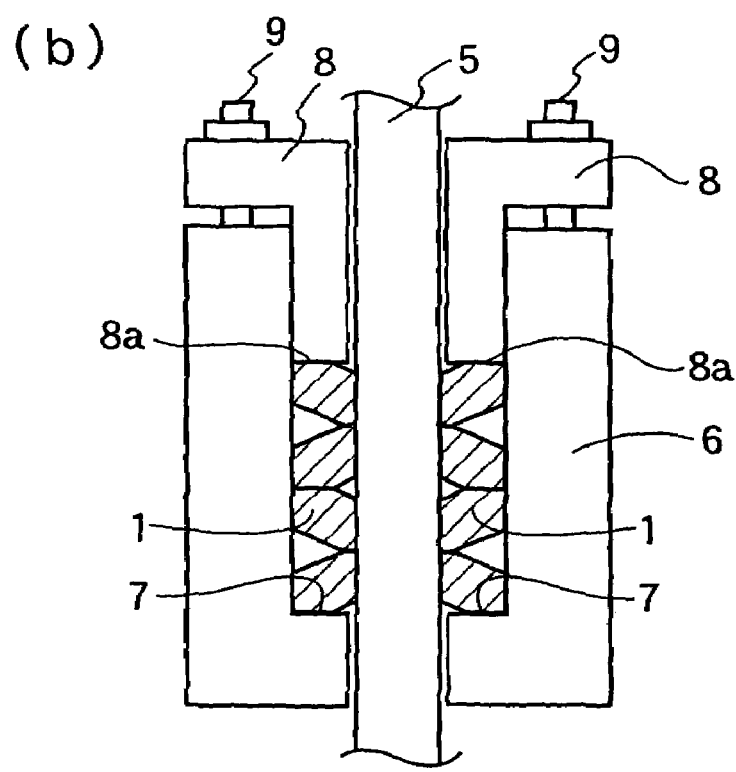

[Fig.6]
(a) 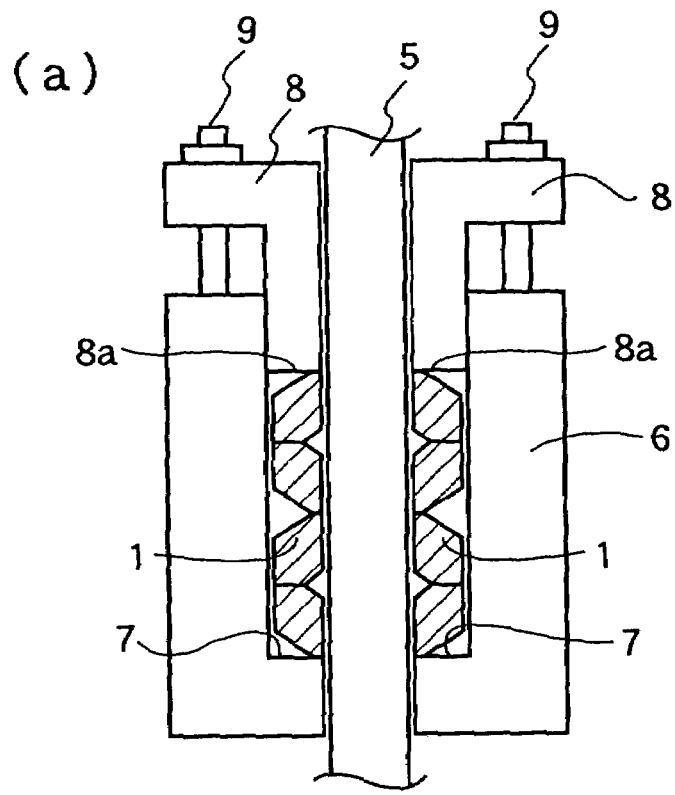
(b) 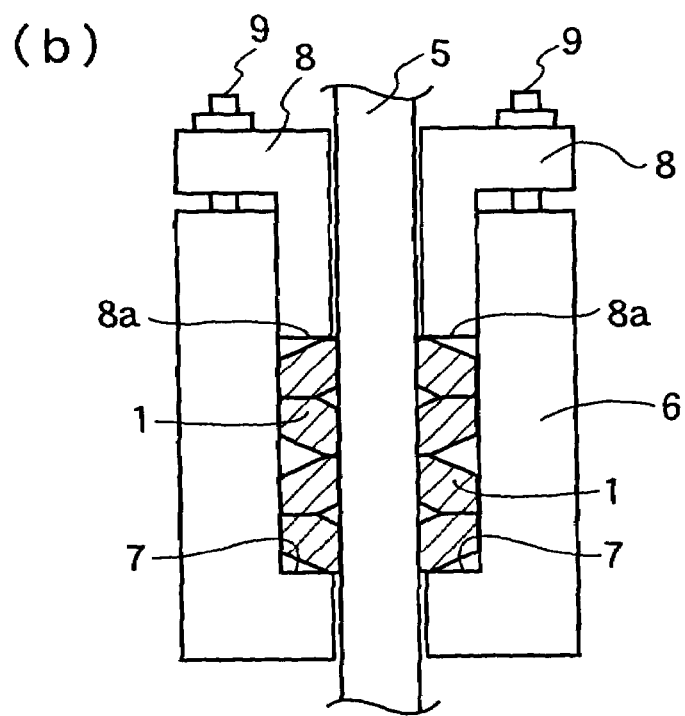

[Fig.7]
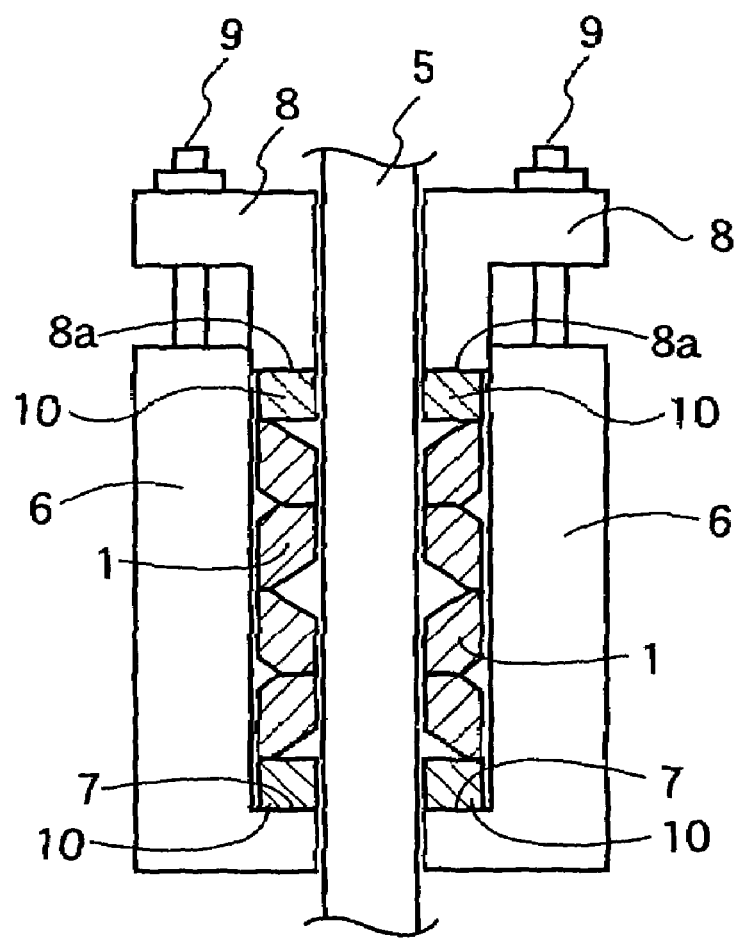

[Fig.8]
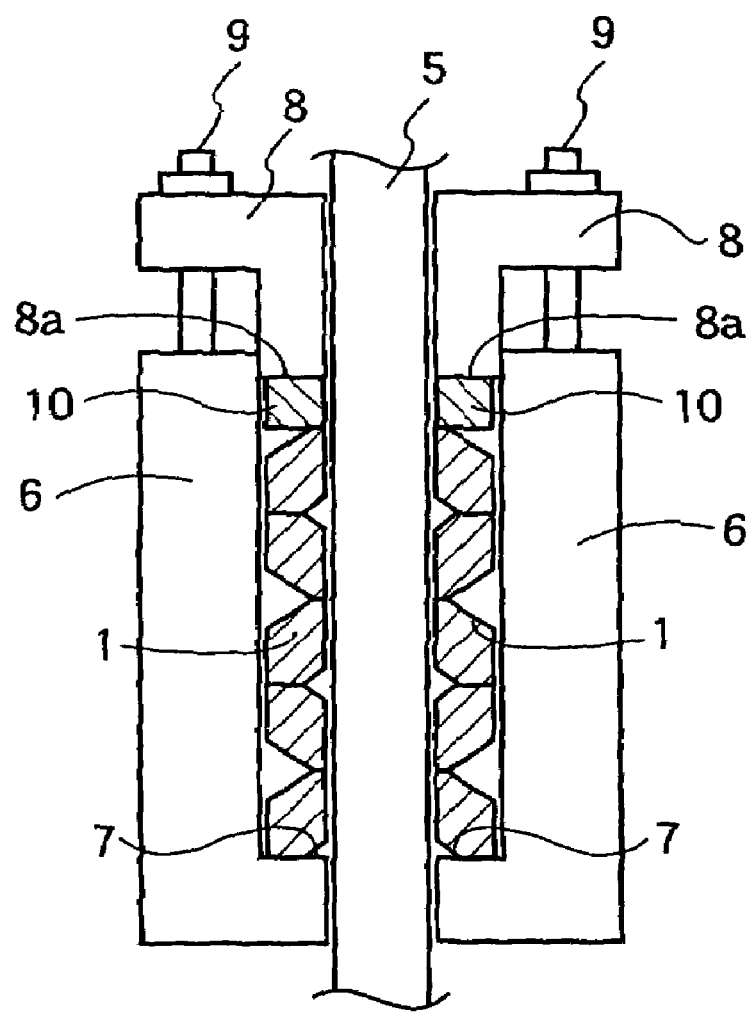

[Fig.9]
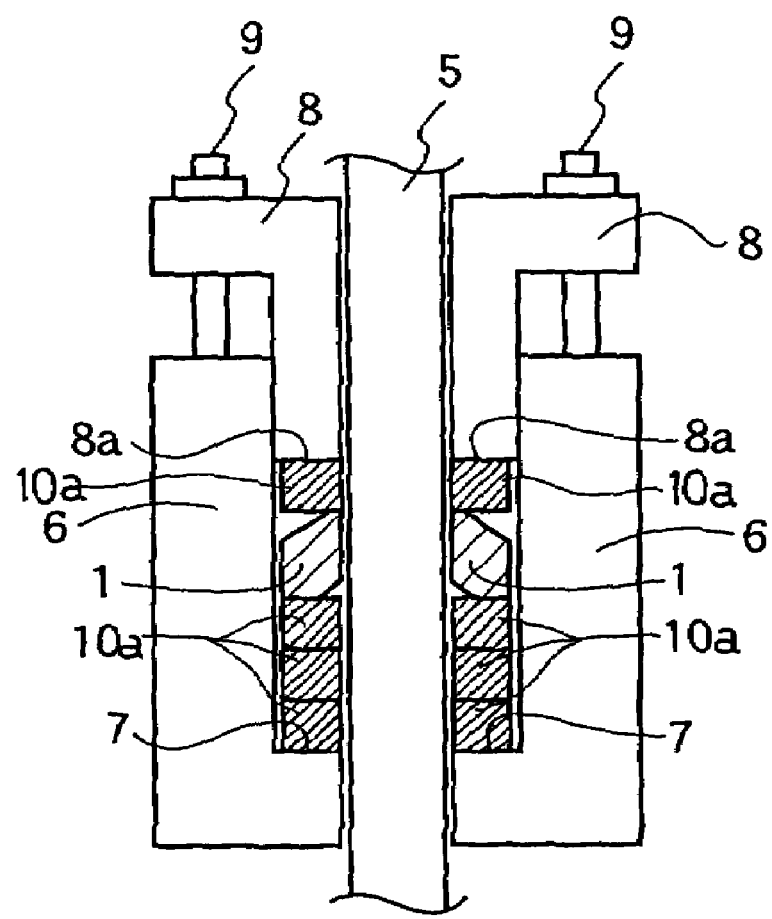

[Fig.10]
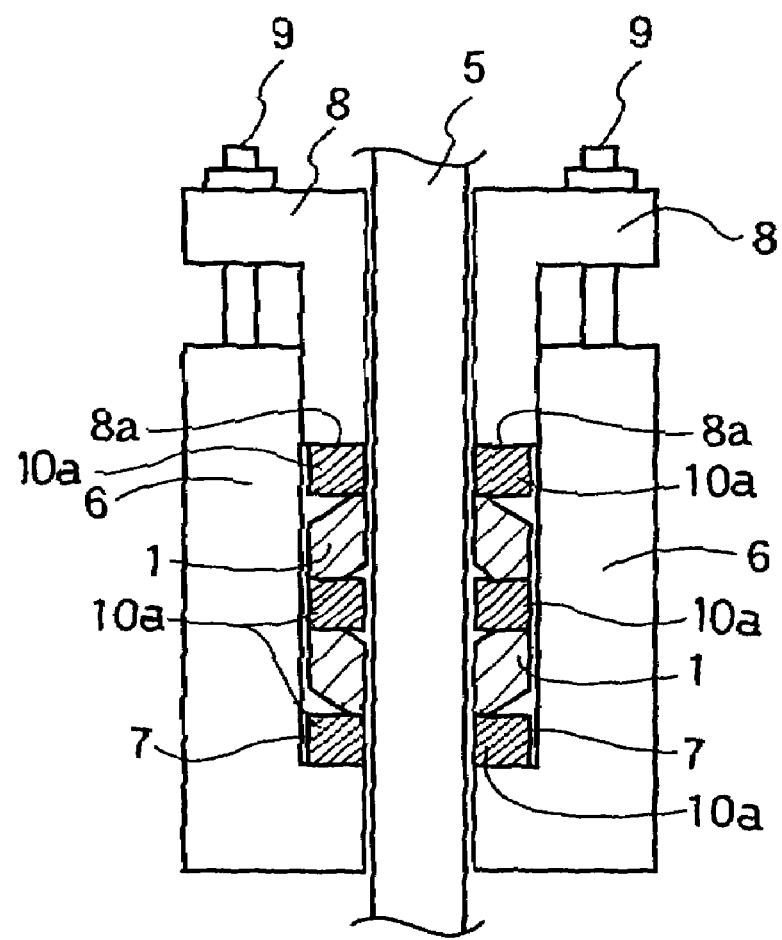

[Fig.11]
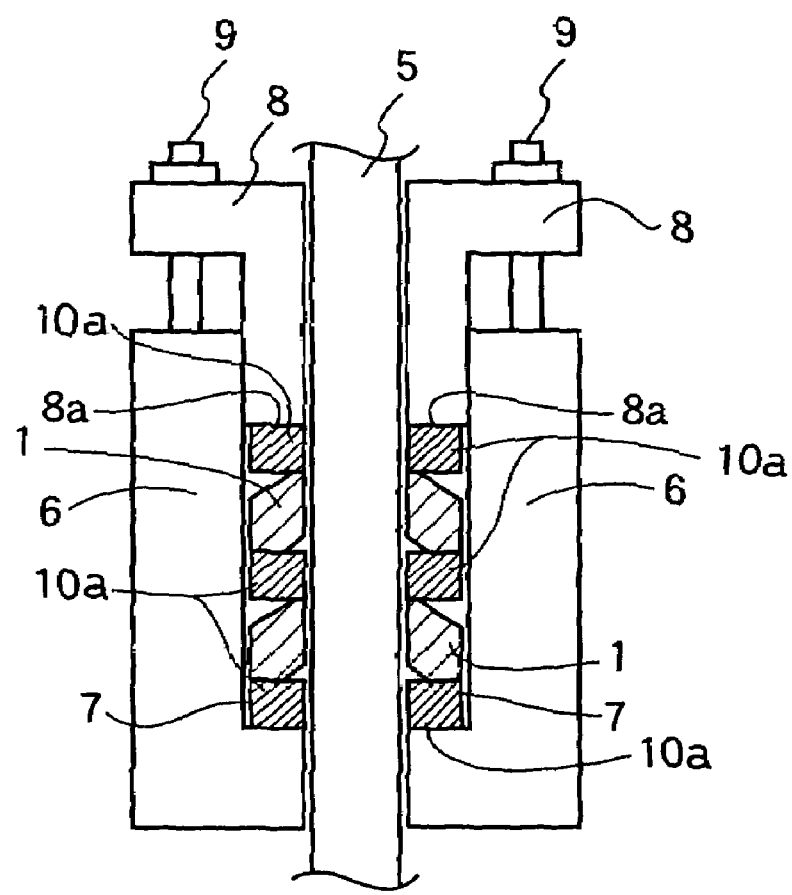

[Fig.12]
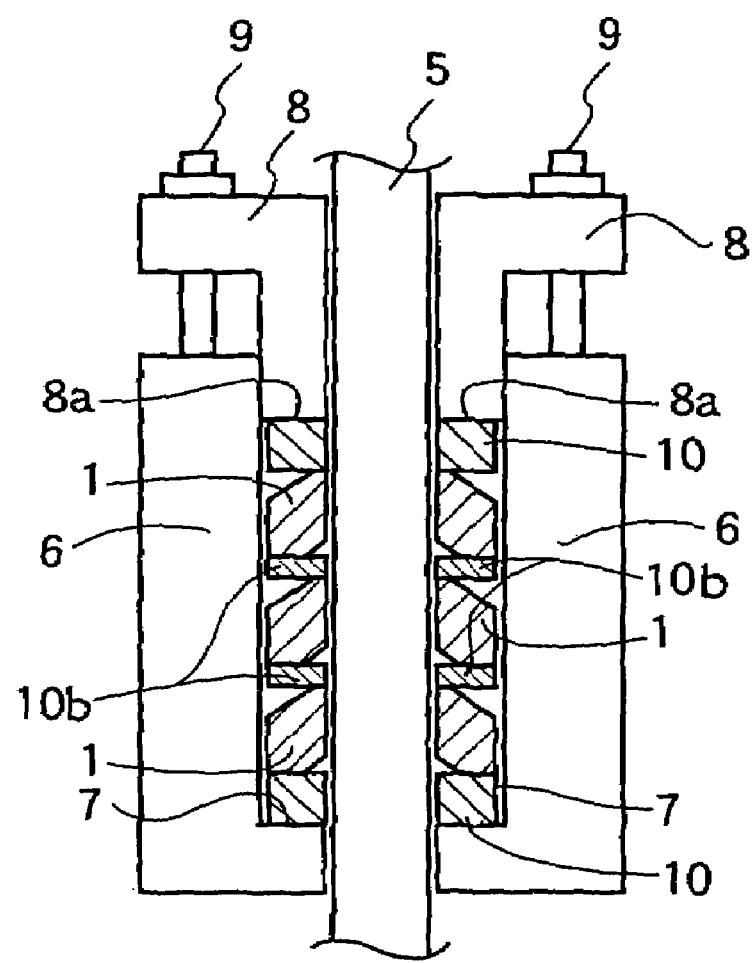

[Fig.13]
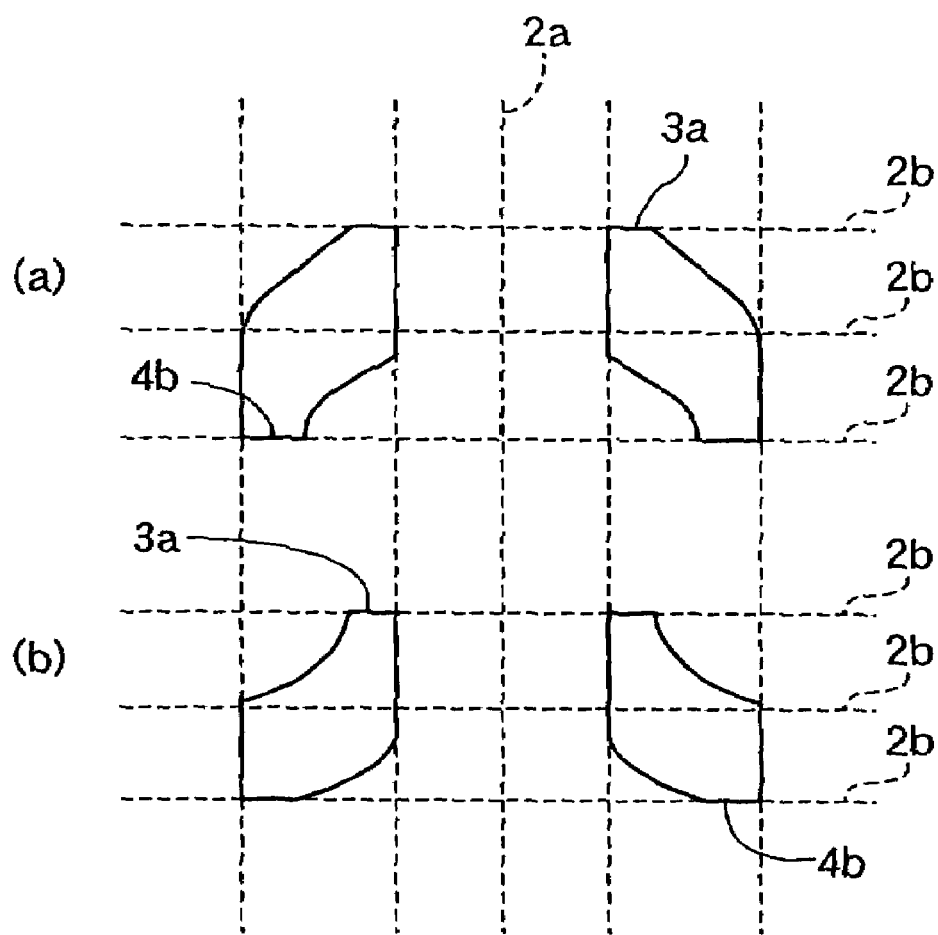

[Fig.14]
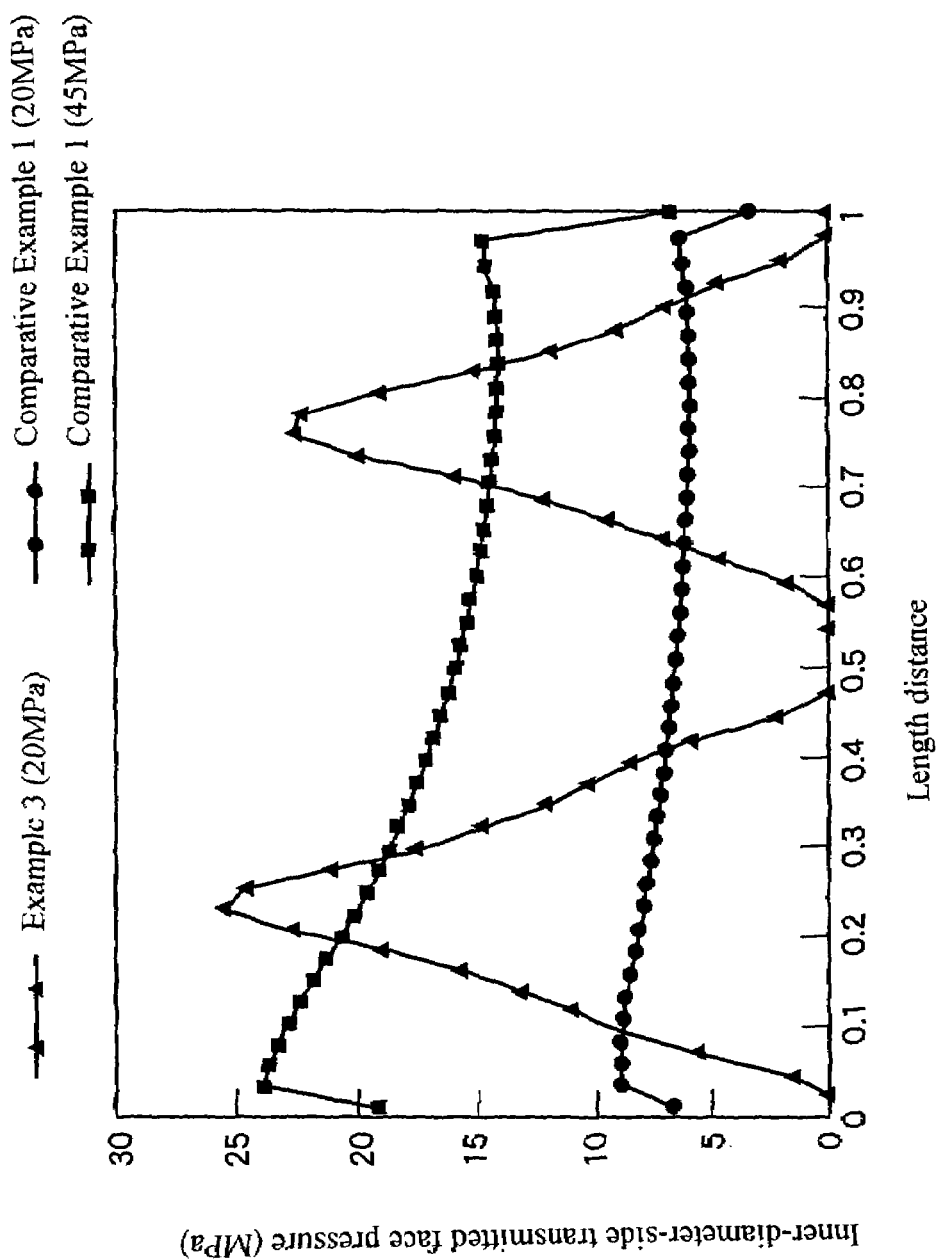

[Fig.15]
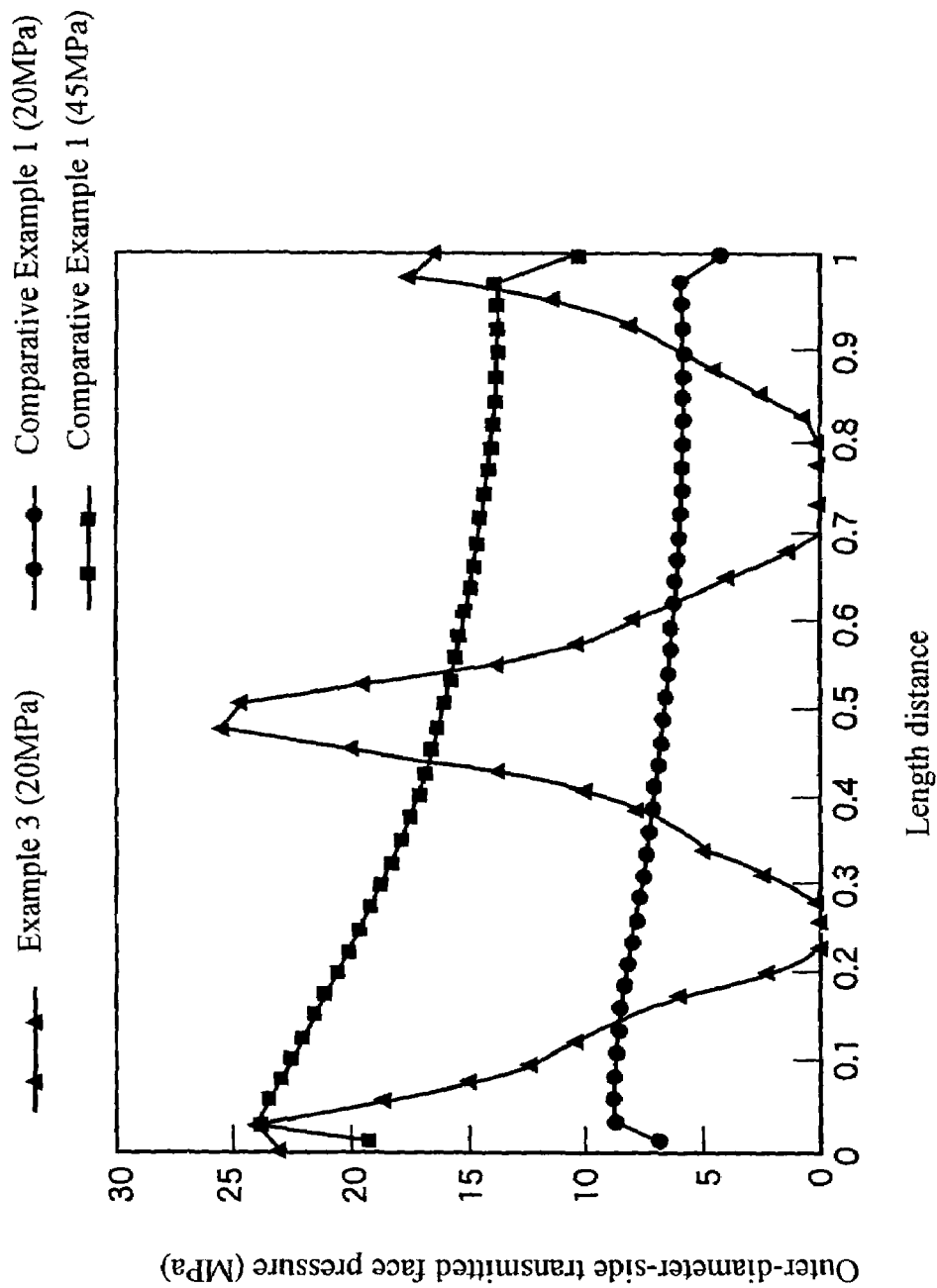

[Fig.16]
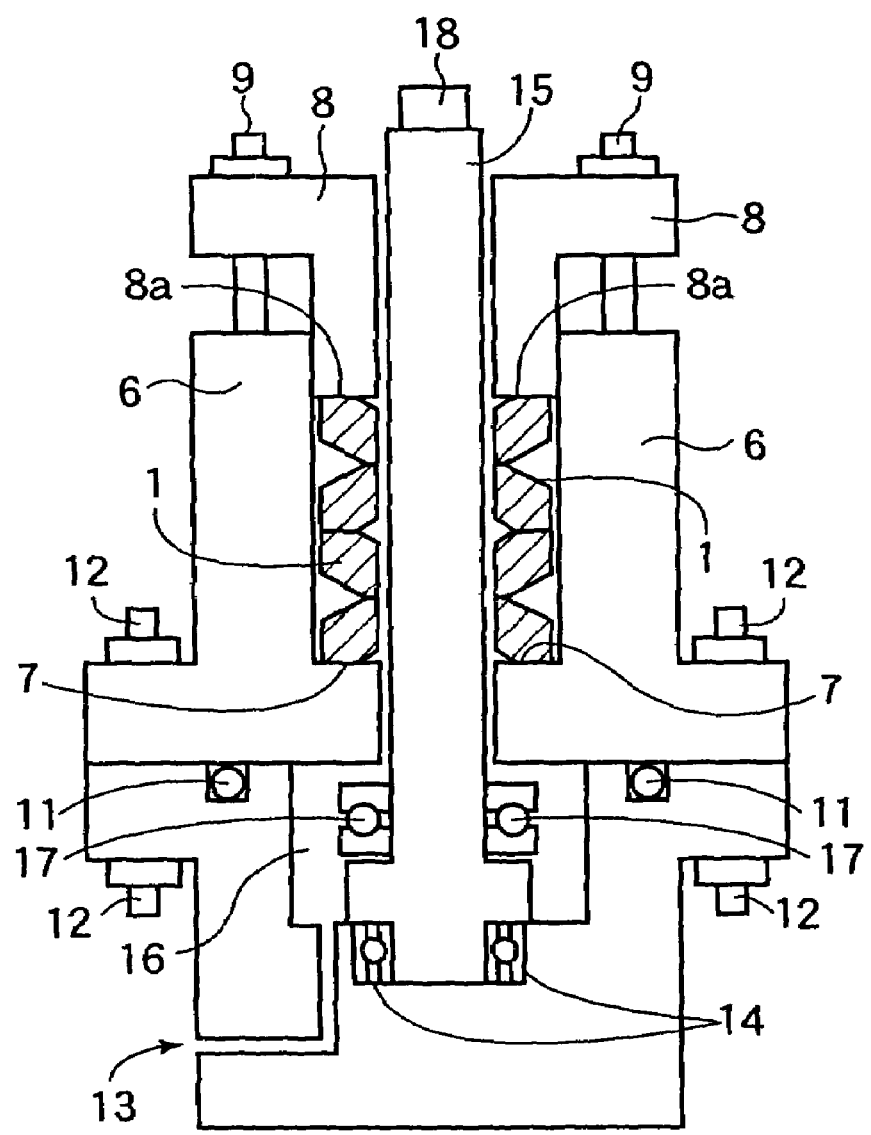

GLAND PACKING AND SEALING APPARATUS COMPRISING IT

TECHNICAL FIELD

The present invention relates to a gland packing and a sealing apparatus comprising this.

Particularly, the present invention relates to a gland packing and a sealing apparatus comprising this, wherein the gland packing is, for example, equipped in a stuffing box and can effectively seal such as a stem in this stuffing box.

More particularly, the present invention relates to a gland packing and a sealing apparatus comprising this, wherein the gland packing can seal moving portions of such as rotary pumps, valves, stirrers, and reciprocating pumps, and is effective when it is utilized in order to fit for various moving properties and all the sealing requisite properties of such as a stem.

BACKGROUND ART

As to a gland packing which is equipped in a stuffing box and which seals such as a stem in the stuffing box and inner wall surfaces of the stuffing box, hitherto, the cross sectional shape thereof has in general been a rectangle (square or oblong), a parallelogram, or a trapezoid having a right angle, and it has been generally known that at least any two of the gland packings are mutually attached closely, piled, and then used.

However, conventional gland packings have various problems. For example, when at least two gland packings of which all the cross sectional shapes are rectangles above are piled and equipped to a stem, there are problems such that: there is much scatter of the extension and deformation of the gland packings in the vertical directions (hereinafter, referred to as "in the directions of the inner and outer diameters") to the tightening face pressure of the packing holder; and the exceedingly tightened portions and the loosely tightened portions easily coexist. Therefore, the tightening face pressure of the packing holder is inevitably increased exceedingly. Therewith, there is a demerit of increasing the moving resistance and required torque of the stem, or there is a fault such that: the gland packing materials are thrust into an opening at the stem side, and then protruded; and therefore the lowering of the sealing performance (sealability) and the leakage of enclosed materials are caused.

Accordingly, an attempt to facilitate the extension and deformation of the gland packing and to lower the tightening face pressure of the packing holder is made by comparatively lowering the density of the gland packing as used (namely, softening the gland packing). However, because of the character such that the extension and deformation amount in the directions of the inner and outer diameters of the aforementioned low-density gland packing is smaller than the compression and deformation amount in the direction of tightening the packing holder, it was necessary to further increase the tightening face pressure of the packing holder finally so that the stem would be sealed sufficiently. Furthermore, because the strain ratio (strain amount) of the aforementioned low-density gland packing is large, the number of gland packings necessary for sealing the stem may exceed an acceptable limit in the stuffing box, and besides there is a demerit of not achieving the function as a shaft receiver that prevents a moving error or vibration of the stem due to its softness, and there is also a problem of the permeation and leakage of the material itself because of the low density.

On the other hand, if the density is made high, the shape stability of the gland packing is improved, and the gland packing can be made excellent in such as functions as the shaft receiver. However, the extension and deformation amount in the directions of the inner and outer diameters to the tightening face pressure of the packing holder is fundamentally small. Therefore, it is necessary to further increase the tightening face pressure of the packing holder so that the stem would be sealed sufficiently. Therewith, caused are problems such that the sealing apparatus is enlarged and the handling convenience is lost.

As to the sealing apparatus, in addition to those which have a structure in which main packings of a kind are used in the above way, sealing apparatuses for such as stems in which at least two kinds of gland packings comprised of different materials or having different properties are mutually attached and equipped in a stuffing box have been well known hitherto. However, the reason that such a structure is selected is that at least two requisite or deficient performances (e.g. sealability, heat resistance, pressure resistance, and frictional resistance) are satisfied at a stroke. This was impossible for conventional gland packings of a kind alone. Therefore, in view of easiness and simplification of the sealing apparatus, there are problems such that at least two kinds of gland packings inevitably cannot help being equipped as the main packings.

In addition, U.S. Pat. No. 4,328,974 discloses a sealing apparatus so as to have a stress concentration in directions of the inner and outer diameters of a packing, in which a low-density gland packing of which the cross sectional shape is a parallelogram is placed between high-density gland packings of which the cross sectional shapes are trapezoids, and the shapes of both are made not to be mutually attached, and besides they are piled and equipped on a stem in a stuffing box, and thereafter the packings are mutually attached by tightening a packing holder. However, in the sealing apparatus according to this prior invention, there are various problems such that: 1) it is necessary to combine at least two packings having different densities; 2) low-density packings having a large strain ratio account for majority; 3) there is a stress concentration, but the number thereof is small; 4) in other than the stress concentration, the tightening face pressure of the packing is not transmitted more than that of a rectangular packing; and 5) the function of the low-density packing portion as a shaft receiver is lowered.

DISCLOSURE OF THE INVENTION

Object of the Invention

Accordingly, an object of the present invention is to provide a novel gland packing and a sealing apparatus comprising this, wherein the gland packing displays high and stable sealability for a stem and an inner wall surface of a stuffing box even for uses further requesting the movability (rotation and reciprocating movement), and further, gives excellent effects, such as decrease of moving resistance of a stem, shape stability, adaptability to a corroded and worn-out stem and stuffing box, function for receiving shafts, easiness of equipment, simplification of sealing structure, and compactness of a sealing apparatus.

SUMMARY OF THE INVENTION

The present inventor diligently studied to solve the above-mentioned problems, and focused upon what improvement that has never been found should be carried out as to the shape of the gland packing for the purpose of enabling it to display high sealability, and then repeated various presumptions and experiments. The reason therefor is as follows. In the past, as is mentioned above, there were examples in which the shapes were slightly thought out. However, even in those cases, substantially expected are the effects as obtained by focusing upon the combinations of materials or properties of gland packings themselves, and as a result, by that alone, a definite effect can be obtained, whereas various demerits are also caused. That is to say, he thought that the desirable effects of which the improvement has hitherto been attempted by contriving the properties should be intended to be given by carrying out a characteristic improvement mainly on the shape of the gland packing.

Based on the above findings, he repeated trials and errors, and various studies. As a result, he has completed the present invention by confirming that a novel gland packing and a sealing apparatus comprising this can solve the above-mentioned problems at a stroke; which gland packing is a so-called conical-plate-shaped gland packing, in which the cross sectional shape of the ring portion of the ring packing is a quadrilateral, and this quadrilateral consists of two inner-diameter-side and outer-diameter-side edges parallel to a central axis of the gland packing, and the other two edges facing each other and having slopes of the same orientation as to an axis perpendicular to the central axis, wherein portions corresponding to upper and lower ends in the direction of the central axis, namely, an inner-diameter-side acute angle portion and an outer-diameter-side acute angle portion of the gland packing, are made flat portions.

When a load is applied in the upward and downward directions of the central axis, the gland packing, according to the present invention, is efficiently deformed in the directions of the inner and outer diameters as if an umbrella were spread (so-called washer deformation of conical plate diameter), so that a stress is caused. Therefore, for example, when this gland packing is equipped to a stem in a stuffing box and then tightened, such as greatly excellent sealability can be displayed even if the tightening load is either equal to or less than the conventional tightening load. In addition, when the above equipment is carried out, at least two gland packings are usually used similarly to the conventional equipment. In addition to being characterized in that the gland packing according to the present invention is conical-plate-shaped, as is mentioned above, the flat portions are arranged at the upper and lower ends. Therefore, the gland packings can contact with each other more certainly and stably than gland packings having no flat portions. The flat portions contact with each other usually when the equipment is carried out in such a manner that the slope orientation (shape) of one gland packing is opposite to that of its neighboring gland packing in reference to the direction of the central axis. For example, if this relation is repeated by at least two gland packings, then the equipment is carried out in such a manner that the slopes are alternately oriented as a whole. As a result, as to the sealing apparatus in which the present invention gland packing is practically used, very efficient and high sealability can be displayed multistage-wise both to the inner and outer diameter sides almost without depending upon the distance from the tightening portion, because of the above certain and stable contact and of the so-called alternating equipment.

That is to say, a gland packing, according to the present invention, is a ring packing of which the cross sectional shape is a quadrilateral, wherein both two edges at inner and outer diameter sides of the quadrilateral are parallel to a central axis of the gland packing, and wherein the other two edges have slopes of the same orientation as to an axis perpendicular to the central axis, with the gland packing being characterized in that an inner-diameter-side acute angle portion and an outer-diameter-side acute angle portion of the quadrilateral are made flat portions.

In addition, a sealing apparatus, according to the present invention, is equipped with gland packings that are piled in a stuffing box, and seals the stuffing box, with the sealing apparatus being characterized in that:

each of the gland packings is a gland packing in which flat portions are arranged at an inner-diameter-side acute angle portion and an outer-diameter-side acute angle portion of a ring packing of which the cross sectional shape is a quadrilateral including: two edges at inner and outer diameter sides of the quadrilateral wherein the two edges are parallel to a central axis of the gland packing; and the other two edges which have slopes of the same orientation as to a vertical axis perpendicular to the central axis; and at least one of the gland packings as equipped in the stuffing box is equipped therein in such a manner that the orientations of the slopes of the other two edges of the at least one of the gland packings are different from those of the other gland packings.

BRIEF DESCRIPTION OF THE DRAWING

FIG. 1(a) is a perspective view showing one working example of the present invention gland packing. FIG. 1(b) is a perspective view when the gland packing as shown in FIG. 1(a) is upside down. In addition, FIG. 1(c) is a projective view in the width direction of the gland packing as shown in FIG. 1(a) or (b), and FIG. 1(d) is a projective view in the thickness direction of the gland packing as shown in FIG. 1(a) or (b).

Both FIGS. 2(a) and (b) are partially cross sectional views showing one working example of the present invention gland packing when the gland packing is cut by a plane including a central axis 2a. Then, FIG. 2(a) represents the case of $\alpha > \beta$, and FIG. 2(b) represents the case of $\alpha < \beta$.

FIG. 3 is a partially cross sectional view showing a gland packing as a referential art when the gland packing is cut by a plane including a central axis 2a.

Both FIGS. 4(a) and (b) are partially end sectional views showing one working example of the present invention gland packing when the gland packing is cut by a plane including a central axis 2a. Then, FIG. 4(a) represents the gland packing before deformation, and FIG. 4(b) represents the gland packing after deformation.

FIG. 5 is a schematic cross sectional view showing one working example of a sealing apparatus comprising the present invention gland packing. FIG. 5(a) represents the sealing apparatus before sealing (before a packing holder 8 is tightened), and FIG. 5(b) represents the sealing apparatus after sealing (after a packing holder 8 is tightened).

FIG. 6 is a schematic cross sectional view showing one working example of a sealing apparatus comprising the present invention gland packing. FIG. 6(a) represents the sealing apparatus before sealing (before a packing holder 8 is tightened), and FIG. 6(b) represents the sealing apparatus after sealing (after a packing holder 8 is tightened).

FIG. 7 is a schematic cross sectional view showing one working example of a sealing apparatus comprising the present invention gland packing and further being equipped with an adaptor packing, and represents the sealing apparatus before sealing (before a packing holder 8 is tightened).

FIG. 8 is a schematic cross sectional view showing one working example of a sealing apparatus comprising the present invention gland packing and further being equipped with an adaptor packing, and represents the sealing apparatus before sealing (before a packing holder 8 is tightened).

FIG. 9 is a schematic cross sectional view showing one working example of a sealing apparatus being equipped with a combination of the present invention gland packing and a conventional-type gland packing, and represents the sealing apparatus before sealing (before a packing holder 8 is tightened).

FIG. 10 is a schematic cross sectional view showing one working example of a sealing apparatus being equipped with a combination of the present invention gland packing and a conventional-type gland packing, and represents the sealing apparatus before sealing (before a packing holder 8 is tightened).

FIG. 11 is a schematic cross sectional view showing one working example of a sealing apparatus being equipped with a combination of the present invention gland packing and a conventional-type gland packing, and represents the sealing apparatus before sealing (before a packing holder 8 is tightened).

FIG. 12 is a schematic cross sectional view showing one working example of a sealing apparatus comprising the present invention gland packing and further being equipped with an adaptor packing and a hard ring, and represents the sealing apparatus before sealing (before a packing holder 8 is tightened).

Both FIGS. 13(a) and (b) are partially end sectional views showing one working example of the present invention gland packing when the gland packing is cut by a plane including a central axis 2a, wherein the structure of the present invention gland packing is partially deformed.

FIG. 14 is a graph in which the X axis represents a "length distance" from the pressurizing face of a packing holder, and in which the Y axis is an "inner-diameter-side transmitted face pressure (MPa)" corresponding to this length distance.

FIG. 15 is a graph in which the X axis represents a "length distance" from the pressurizing face of a packing holder, and in which the Y axis is an "outer-diameter-side transmitted face pressure (MPa)" corresponding to this length distance.

FIG. 16 is a schematic cross sectional view showing one example of a sealing apparatus for testing sealability of a gland packing (sealability-testing apparatus) as mentioned in the Examples.

[Explanation of the Symbols]

| | |
|---|---|
| 1 | Gland packing |
| 2a | Central axis |
| 2b | Vertical axis to central axis |
| 2c | Diametric axis |
| 3a | Inner-diameter-side flat portion |
| 3b | Inner-diameter-side obtuse angle portion |
| 4a | Outer-diameter-side obtuse angle portion |
| 4b | Outer-diameter-side flat portion |
| 3a' | Inner-diameter-side acute angle portion |
| 4b' | Outer-diameter-side acute angle portion |
| 3c | Inner-diameter-side stress-concentrated point |
| 4c | Outer-diameter-side stress-concentrated point |
| 5 | Stem |

-continued

[Explanation of the Symbols]

| | |
|---|---|
| 6 | Stuffing box |
| 7 | Inner bottom portion of stuffing box |
| 8 | Packing holder |
| 8a | Pressurizing face of packing holder |
| 9 | Tightening bolt |
| 10 | Adaptor packing |
| 10a | Gland packing of which the cross sectional shape is rectangular |
| 10b | Hard ring |
| 11 | O-ring |
| 12 | Tightening bolt |
| 13 | Pressurizing opening |
| 14 | Bearings |
| 15 | Stem (driving shaft) |
| 16 | Gas-enclosing portion |
| 17 | Thrust bearings |
| 18 | Portion equipped with torque wrench |

DETAILED DESCRIPTION OF THE INVENTION

Hereinafter, the details of the present invention gland packing and sealing apparatus comprising this are specifically explained.

As is shown in FIGS. 1(a) and (b), the shape of the gland packing according to the present invention (which may hereinafter be referred to as the present invention gland packing) is a ring packing similarly to general gland packings.

The present invention gland packing is a gland packing in which portions corresponding to the inner-diameter-side acute angle portion and the outer-diameter-side acute angle portion of the gland packing of which the cross sectional shape of the ring portion in the central axis direction (namely the cross sectional shape as cut by a plane including the central axis) is a quadrilateral, namely, a portion corresponding to the upper end and a portion corresponding to the lower end in view of a directional axis along the central axis, are made flat portions.

Herein, the above quadrilateral is like the cross section of the gland packing as shown in FIG. 3, and is a quadrilateral in which both an inner-diameter-side edge 1c and an outer-diameter-side edge 1d are parallel to a central axis 2a, and in which the other two edges 1a and 1b have slopes of the same orientation as to a vertical axis 2b perpendicular to the aforementioned central axis 2a. As is shown in FIG. 3, the above slope means an angle α or an angle β. The angle α is an angle between the vertical axis 2b and the edge 1a, and the angle β is an angle between the vertical axis 2b and the edge 1b. Furthermore, the above slopes of the same orientation are defined as that the spreading of the above angles are of the same orientation when the edge 1a and the edge 1b cross the vertical axis 2b at their respective angles on the assumption that the vertical axis 2b is regarded as the standard and that these angles are defined as 0° when the edge 1a and the edge 1b overlap with the vertical axis 2b. Incidentally, the gland packing as shown in FIG. 3 is a gland packing as a referential art for explaining the characteristics of the present invention gland packing.

In addition, the above inner-diameter-side acute angle portion and outer-diameter-side acute angle portion, like the portion 3a' and the portion 4b' as shown in FIG. 3 respectively, mean two angle portions having an acute angle among interior angles of the above quadrilateral. The present invention gland packing is a gland packing, in which these portion 3a' and portion 4b' are made flat portions as mentioned below.

As to the above flat portions, namely, the flat portions that the present invention gland packing, has, it is enough that, for example, those portions are flat to such an extent that the gland packing can substantially stably and certainly contact with a flat portion of such as a neighboring gland packing or an adapter packing when the gland packing is actually equipped to such as a sealing apparatus and then used. There is no especial limitation thereto. Therefore, the above flat portions don't need to be perfect plane portions to overlap with a plane perpendicular to the central axis. The flat portions may have a slight slope, or may have a portion partially having a curved surface, or may have different cross sectional shapes depending upon the position of the cross section (depending upon of which portion the cross section is observed). When the above flat portions are shown as an optional cross sectional shape of the ring portion (an optional cross sectional shape as cut by a plane including the central axis 2a), specifically, preferred examples thereof include a shape such as the portion 3a and the portion 4b that are shown in FIGS. 2(a) and (b). When the total width in the vertical axis 2b direction as to the ring portion of the gland packing is regarded as t, the respective widths A and B of the flat portions 3a and 4b in the direction of the vertical axis 2b are favorably A<0.5 t and B<0.5 t, more favorably A<0.3 t and B<0.3 t. In the case where the above widths A and B are more than 0.5 t, there is a possibility that the gland packing cannot efficiently be deformed in the directions of the inner and outer diameters (so-called washer deformation of conical plate) by a load applied from the central axis direction, resulting in lowering the sealability, because the stress is not sufficiently caused in the directions of the inner and outer diameters.

In the present invention gland packing, there is no especial limitation on the range which the angles α and β as shown in FIGS. 2(a) and (b) can take. Specifically, they are favorably 0°<α<90° and 0°<β<90°, more favorably 5°<α<40° and 0°<β<40°. However, they may fitly be set in consideration of the length A of the above flat portion. In general, if the widths A and B of the flat portions are wide, there are many cases where the angles α and β are set on the large side. Or otherwise if the widths A and B of the flat portions are narrow, there are many cases where the angles α and β are set on the small side. In addition, the angle α may be either equal to the angle β (α=β) or different from the angle β (α≠β), and there is no especial limitation thereto. However, α=β is generally favorable in respect to such as having wide use. Furthermore, the angle difference between the angle α and the angle β, is favorably 0≦|α−β|<20°.

When the angles α and β are within the above ranges and further the angle difference between the angle α and the angle β (|α−β|) is in the above-mentioned range, it can be prevented that the clearances as formed between the gland packings are too large, and that the deformation amount (strain amount) necessary for sufficiently displaying the sealability is excessively large. At the same time, the malfunction of the equipability and handling ability can be prevented wherein the cause of the malfunction is that the total initial equipping length of the gland packings as equipped is too long.

There is no especial limitation on the cross sectional shape of the present invention gland packing if the above flat portions 3a and 4b, and angle α and angle β satisfy the above-mentioned conditions. Specifically, examples thereof include: (1) the two edges at the inner and outer diameter sides have the same length, namely, α=β; (2) of the two edges at the inner diameter side 1c and the outer diameter side 1d, the edge at the outer diameter side 1d is longer, namely, α>β (FIG. 2(a)); and (3) of the two edges at the inner diameter side 1c and the outer diameter side 1d, the edge at the inner diameter side 1c is longer, namely, α<β (FIG. 2(b)).

In the cross sectional shape of the present invention gland packing, there is no especial limitation on its inner and outer diameters or the sizes of such as the inner-diameter-side edge 1c and the outer-diameter-side edge 1d, and it is enough that they are in such ranges as to hold as a ring packing in which the flat portions and the angles α and β can satisfy the above conditions, particularly as a gland packing.

The present invention packing has the above-mentioned characteristic form. Therefore, for example, in the case where the stem 5 in the stuffing box 6 is, as shown in FIG. 5(a) or FIG. 6(a), equipped with the gland packings in such a manner that the gland packings are alternately oriented and where they are thereafter, as shown in FIG. 5(b) or FIG. 6(b), tightened by the packing holder 8, the gland packings are, like the change from FIG.4(a) to FIG. 4(b), extended and deformed in the directions of the inner and outer diameters as if an umbrella were spread (so-called washer deformation of conical plate shape), so that the efficient and excellent sealability is displayed. In addition, the load necessary for extending and deforming the present invention gland packing from FIG. 4(a) of the shape before tightening to FIG. 4(b) of the shape after tightening is fairly decreased in comparison with a gland packing having a rectangular cross section as conventionally generally commonly used. Furthermore, the present invention gland packing also has no problems such as permeation leakage of the packing itself as occurs to such as a low-density gland packing, and can also display the sealability sufficiently.

In detail, when the pressure is applied to the present invention gland packing from a portion giving the load (e.g. a tightening face 8a of the packing holder), the gland packing is compressed in the thickness direction as a whole. As to the deformation of the shape due to this compression, the presence of the aforementioned angle α and angle β is one factor for enabling easy deformation and extension in the directions of the inner and outer diameters. Furthermore, because of the deformation and extension due to this compression, in the gland packing as shown in FIG. 4(b), the peak stress in the directions of the inner and outer diameters is efficiently transmitted greatly particularly at the following portions of: from the inner-diameter-side angle portion 3c to the stem side; and from the outer-diameter-side angle portion 4c to the inner wall surface side of the stuffing box, wherein the angle portion 4c has an opposite-angle relation to the angle portion 3c concerning the cross sectional shape. In the present invention gland packing, this portion which can efficiently transmit the stress is hereinafter referred to as a stress-concentrated point for the sake of convenience.

As to the present invention gland packing, for example, in the case where the present invention gland packing seals such as the stem or the inner wall surface of the stuffing box, the sealability is displayed by the peak stress as caused at the stress-concentrated point when the gland packing is extended and deformed in the directions of the inner and outer diameters. Therefore, even if the total stress as transmitted in the directions of the inner and outer diameters (for example, the total force that holds the stem) is smaller than that in use of a conventional gland packing, the lowering of the sealability is not observed. In short, even if the tightening face pressure is smaller than conventional, the seal can be carried out sufficiently. Therefore, the axis resistance as caused when the tightening and sealing are carried out is lowered as the reflective effect. For example, when the gland packing is used for a seal portion of a valve, the hand torque necessary for opening and shutting the valve can be lowered. Similarly, the deterioration of such as the stem and packing and the deterioration of the gland packing itself due to friction when the tightening and sealing are carried out can be lowered greatly. Therefore, it can be said that the gland packing is particularly favorable to a seal portion of an equipment in which the axis movement is carried out so frequently as to usually make such as the seal abrasion very large.

When the present invention gland packing displays not less efficient and not less excellent sealability than conventional ones, even a tightening face pressure lower than conventional is permitted. Therefore, for example, there is no especial limitation on such as the packing holder 8. These neighboring machines can be prevented from enlarging and weighting, and can be compacted, and besides the entire sealing apparatus can be prevented from enlarging, and can be compacted.

In a specific use in which the high sealability is requested, it has hitherto been determined that the use is met by a gland packing of which the size is strictly set for the outer diameter of a stem and the inner measurements of a stuffing box (gland packing in which: there little exists so-called tolerance, and there is little opening between the gland packing and the stem, and between the gland packing and the inner wall surface of the stuffing box). However, as mentioned above, the present invention gland packing has efficient and soft deformability and extensibility in the directions of the inner and outer diameters, and has the flat portions that can contact with each other certainly and stably. Therefore, even if the measurements are not strictly set according to an object in a specific use, the gland packing can meet the use. Furthermore, also in cases of usual use, a gland packing having one set of measurements can meet wide conditions of measurements (measurements conditions of various objects) alone. Therefore, the setting of the size kinds of the gland packings (kinds of product sizes) may be little, and the production efficiency rises, and the production costs can be decreased. Specifically, when the present invention gland packing is used for a sealing apparatus comprising such as a stuffing box, the optimum deformation and extension amount to meet the individual conditions of the various objects can be given to the aforementioned gland packing by adjusting the tightening face pressure. Therefore, it can be used under wide conditions, and simultaneously the high sealability can be achieved. In addition, when a conventional gland packing is equipped to such as a stem in a stuffing box, it accompanies difficulty of equipment in some extent (especially in cases of high-density-type sealing apparatuses or in cases where the high sealability as mentioned above is requested, the difficulty is larger, for example, because such as measurements are considerably strict). However, when the present invention gland packing is used, the high sealability is ensured due to the efficient deformability and extensibility in the directions of the inner and outer diameters, therefore the measurements can afford to be set to make the equipment easier than conventional products. Furthermore, even in cases where various changes in size have occurred later, for example, in cases where the size of the gland packing has changed from the original size due to such as friction and corrosion with the passage of time and in cases where the size of the stem or inner wall surface of the stuffing box has changed from the original size due to such as abrasion and corrosion (although there is no especial limitation to these cases), suitable adjustment of the tightening face pressure makes it also possible that the gland packing is extended and deformed efficiently and softly in the directions of the inner and outer diameters, thereby fitting the size again. Therefore, the optimum sealability can be ensured again.

There is no especial limitation on the density (hardness) of the present invention gland packing, but it may be fitly be adjusted to the optimum density according to the sealability as requested and peripheral apparatuses. As mentioned above, the present invention gland packing has efficient deformability and extensibility in the directions of the inner and outer diameters. Therefore, for example, the good deformation and extension in the directions of the inner and outer diameters can be carried out by a tightening face pressure smaller than the tightening face pressure that has hitherto been regarded as necessary when the density is increased higher than usual. Accordingly, the use of the present invention gland packing can solve the demerits coming into question about such as conventional gland packings that have higher density than usual, especially, rectangular high-density gland packings wherein the above demerits are for example as follows: the lack of transmitting the stress against the tightening face pressure due to lack of softness (deformability and extensibility) in the directions of the inner and outer diameters; the difficulty of the equipment; the enlargement of apparatuses in compliance with such as dynamic request; and the increase of the axis resistance as caused by the non-uniform deformation. By such reasons, when the present invention gland packing is molded in high density, various excellent functions (e.g. shape stability, abrasion resistance, anticorrosion, function of receiving a shaft such as a stem (function of preventing a moving error or vibration of the shaft), and easiness of equipment) can be given to the present invention gland packing, though the functions are not limited to these.

There is no especial limitation on the structural shape and material quality of the present invention gland packing, but specifically, preferred examples thereof include knitted and plaited packings, laminated packings, metal packings, graphite packings, and resin-molded packings.

The aforementioned knitted and plaited packings are generally packings as obtained by knitting and plaiting either one yarn comprised of various fibrous materials (e.g. carbon fibers and aramide fibers), or a thread obtained by twisting at least two yarns, into desired shapes by such as braiding, braiding-over-braiding, square-braiding, and inter-braiding.

The aforementioned laminated packings are generally packings as obtained by: stamping out a sheet material; and then processing the resultant material into a desired shape by suitable methods such as cutting; and then press-molding the processed material with such as a mold.

The aforementioned metal packings are mainly packings as obtained by compression-molding such as metal foils.

Among these, the graphite packings and fluororesins are particularly favorable as the material quality as used in the present invention gland packing, because they are excellent in chemical resistance and self-lubricity.

The aforementioned graphite packings are generally packings of which the major material is expanded graphite. Specifically, although not especially limited, preferred examples thereof include tape-molding-type (curling-type) packings, tape-molding-type packings containing wire mesh, tape-molding-type packings containing metal foil, braided-type packings, laminated-type packings, and compressed-molding-type packings. The main raw material of the graphite packings is the expanded graphite, but supplement materials (e.g. metal foils, metal wires, metal nonwoven fabrics, various fibrous materials, liquid lubricants, and solid lubricants) can favorably be used further. These may be used either alone respectively or in combinations with each other.

The fluororesin packings are packings of which the major raw material is a fluororesin. Specifically, although not especially limited, preferred examples of the raw material include PTFE (polytetrafluoroethylene), PFA (polytetrafluoroethylene perfluoroalkyl ether copolymers), and FEP (copolymers of tetrafluoroethylene and hexafluoropropylene), and they are, for example, molded by cutting-processing of sleeve-shaped molded structures or by injection molding of raw pellets. The main raw material is the fluororesin, but supplement materials (e.g. metal foils, metal wires, metal nonwoven fabrics, various fibrous materials, and besides, liquid lubricants and solid lubricants for coating or combining) can favorably be used further. These may be used either alone respectively or in combinations with each other.

There is no especial limitation on the metals as the aforementioned supplement materials, but preferred examples thereof include aluminum, lead, copper, stainless, Monel, and Inconel. In addition, these may be used either alone respectively or in combinations with each other. There is no especial limitation on the shapes when they are used, but preferred examples thereof include foils, ribbons, particles, and cotton chips.

There is no especial limitation on the fibrous materials as the aforementioned supplement materials, but preferred examples thereof include cotton, linen, nylon, PPS fibers, fluororesin fibers, fluororesin fibers containing graphite, carbon fibers, carbonized fibers, graphitized fibers, metal fibers, glass fibers, aramide fibers, phenol fibers, ceramic fibers, and asbestos. These may be used either alone respectively or in combinations with each other.

There is no especial limitation on the liquid lubricants as the aforementioned supplement materials, but preferred examples thereof include mineral oils, synthetic oils, fats, synthetic fats, fluorinated oils, silicone oils, Vaseline, and various greases. These may be used either alone respectively or in combinations with each other.

There is no especial limitation on the solid lubricants as the aforementioned supplement materials, but preferred examples thereof include graphite, molybdenum disulfide, tungsten disulfide, boron nitride, fluororesins, mica, talc, gold, silver, lead, and various soft metals. These may be used either alone respectively or in combinations with each other.

There is no especial limitation on alloys and blending resins, but preferred examples thereof include nylon resins, PPS resins, acetal resins, phenol resins, epoxy resins, and various rubbers. These may be used either alone respectively or in combinations with each other.

In the case where the aforementioned expanded graphite is included as a material when the present invention gland packing is molded, there can be obtained a gland packing that is excellent in performances such as chemical resistance, movability, stress relaxability, and particularly, stability in a wide temperature range, although there is no especial limitation thereto. In addition, there is no especial limitation on a molding method for the present invention gland packing containing the aforementioned expanded graphite as a material, but, specifically, preferred examples thereof include: 1) a tape-mold molding method which involves curly rolling an expanded graphite tape, and thereafter press-molding from the direction of a rolling axis; 2) a laminated-sheet molding method which involves stamping out expanded graphite sheets into a desired shape with such as a mold, and laminating and press-molding these resultant stamped-out sheets; 3) a molding method which involves knitting and plaiting an expanded graphite yarn, and then press-molding the resultant knitted and plaited material; and 4) a three-dimensional-knitting-and-plaiting molding method which involves molding into a desired shape with a three-dimensional-knitting-and-plaiting machine. Among these, the 1) tape-mold molding method and 2) laminated-sheet molding method are particularly favorable.

In the case where the fluororesin such as PTFE or PFA is included as a material when the present invention gland packing is molded, there can be obtained a gland packing that is excellent in performances such as chemical resistance, movability, and low dust generation property, although there is no especial limitation thereto. In addition, there is no especial limitation on a molding method for the present invention gland packing containing the aforementioned fluororesin, but, specifically, preferred examples thereof include: 1) in case of using the PTFE, a molding method which involves cutting-processing sleeve-shaped molded products into a desired shape; and 2) in case of using the PFA, a molding method which involves directly shaping raw pellets into a desired shape by such as injection molding.

In addition, as to the molding of the present invention gland packing, there is no especial limitation on a preparing or processing method for making the aforementioned flat portions, but it may be a preparing or processing method as usually used. Specifically, examples thereof include methods that involve such as: changing the shape of the mold, as used for molding, in such a manner that the aforementioned flat portions will be formed; or once molding, and thereafter cutting-processing.

Preferred examples of the sealing apparatus comprising the present invention gland packing include a sealing apparatus in which at least two of the aforementioned present invention gland packings are equipped to the stem in stuffing box. In detail, for example, as shown in FIG. 5(a) or FIG. 6(a), it is favorable that the stem 5 in the stuffing box 6 is equipped with at least two of the above present invention gland packings 1 in such a manner that they are piled in alternate orientation, and then the stem 5 and the inner wall surface of the stuffing box 6 is sealed by tightening the packing holder 8. On this occasion, the orientation of the shape of the equipped gland packings 1 is favorably such that the slopes of the aforementioned other two edges (1a and 1b) are alternately oriented. Incidentally, concerning how to alternately orient the slopes, there are, for example, a pattern as shown in FIG. 5(a) and a pattern as shown in FIG. 6(a). In what orientation and order the equipment is carried out can be changed according to the using object and use. In addition, such as the number of the gland packings as equipped can be variously changed. In addition, it is not limited to the alternating equipment of all the gland packings, but the equipment can also be carried out in such a manner that a part of the gland packings are piled in the same orientation and the others are piled in alternate orientation. Specifically, unless all the present invention gland packings are equipped in the same slope orientation, the effects of the present invention can be displayed in any way of equipment.

Of FIG. 5(a) and FIG. 6(a), either equipping method will do, but the form of FIG. 5(a) is usually favorable in general. If the form of FIG. 5(a) is selected, the contact area between both end gland packings and the stem is in a state of being apart from the pressurizing face of the packing holder and the inner bottom portion of the stuffing box because of the clearance as formed between both end gland packings and the pressurizing face and the inner bottom portion. Therefore, a so-called "protrusion (thrust)" as caused by tightening after the equipment of the gland packings can be prevented, and the lowering of the sealability can be prevented. The "protrusion (thrust)", for example, means that, in FIG. 6(a), a portion of the gland packing to which a load is applied gets into such as: a slight opening of a portion where the stem 5 penetrates the inner bottom portion 7 of the stuffing box; or a slight opening between the stem 5 and the packing holder 8. It causes lowering the sealability of the apparatus.

In the sealing apparatus comprising the present invention gland packing, all the structural factors (e.g. shape, measurements, and further, material quality) of the gland packings 1 as used are favorably the same as those of each other gland packing in consideration of convenience and uniform sealability regardless of each seal portion. However, there is no especial limitation thereto. Various gland packings, of which such as the width of the above flat portions, the respective sizes of the above angle α and angle β, and the shape or measurements of other portions, and further the material quality are different, may be used in any combination with each other. Incidentally, as is shown in FIG. 7 and FIG. 8, the inner bottom portion 7 side and/or the packing holder 8 side in the stuffing box may be equipped with adapter packings 10. In addition, as is shown in FIG. 9, at least one of the present invention gland packings may be used together with at least two of conventional-type gland packings 10a of which the cross sectional shapes are rectangular. In addition, as is shown in FIG. 10 and FIG. 11, the present invention gland packings may be used together with conventional-type gland packings 10b of which the cross sectional shapes are rectangular in such a manner that the conventional-type gland packings are allowed to intervene between the present invention gland packings. Furthermore, as is shown in FIG. 12, members other than the gland packing may be used together. For example, hard rings 10b comprised of such as metals or resins are used with them allowed to intervene, whereby the extent of tightening the entire sealing apparatus or the balance between the sealability and the low torque can be adjusted according to the using object and use. In this way, also when such as the adapter packings 10, the above conventional-type gland packings 10a, or the hard rings 10b are used together, all the structural factors (e.g. shape, measurements, and further, material quality) of the present invention gland packings 1 are favorably the same as those of each other gland packing. However, there is no especial limitation thereto, and the various gland packings as mentioned above may be used in any combination with each other. If only gland packings of a kind are used when such as a stem is sealed, there have hitherto been many cases such as "requisite performances or items that cannot be satisfied" and "deficient performances that cannot be compensated". Therefore, for example, at least two kinds of gland packings having different shapes, densities, and material qualities have been selected, combined, and used. There is no especial limitation on the above requisite performances and deficient performances, but, specifically, preferred examples thereof include performance of uniform tightening distribution (sealability), heat resistance, pressure resistance, and frictional resistance.

When a gland packing having a high-density character is, for example, selected as the present invention gland packing, the efficient extensibility and deformability that the present invention gland packing has can also be displayed in addition to the high-density character. Therefore, the gland packing can be made to have at least both the characters of the low density and high density as have hitherto been thought. Also in the structure of the present invention sealing apparatus, it is favorable in view of simplification.

As is mentioned above, the present invention gland packing has the efficient extensibility and deformability. Therefore, when at least two of the gland packings are used for the sealing apparatus, the individual gland packings have stress-concentrated points at the inner diameter side and outer diameter side, and the stress can efficiently be caused even if only one kind of gland packing is used. Moreover, when the gland packing is allowed to contact with its neighboring gland packings at the flat portions, the stress concentration is raised at the contact portions due to synergistic effect both at the inner diameter side and outer diameter side. Therefore, in the sealing apparatus comprising the present invention gland packing, gland packings of a kind are favorably used also from the viewpoint of simplifying the structure.

In the sealing apparatus comprising the present invention gland packing, as is shown in FIG. 5(a) and FIG. 6(a), a definite space can be provided between the gland packings 1 as equipped to the stem 5 before the packing holder 8 is tightened. The aforementioned space is derived from that: in the cross sectional shape of the gland packing 1, the aforementioned other two edges (1a and 1b) have their respective slopes of the same orientation as to a vertical axis perpendicular to a central axis; and the at least two gland packings are equipped in such a manner that the orientations of the above slopes will be alternate. For the purpose that the gland packings 1 as equipped to the stem 5 in the stuffing box 6 can, as mentioned above, display the efficient extensibility and deformability in the directions of the inner and outer diameters, it is favorable that such spatial room is provided.

In the sealing apparatus comprising the present invention gland packing, when the tightening face pressure is applied by the packing holder, then, as is shown in FIG. 5(b) and FIG. 6(b), the gland packings 1 utilize the space between them to become extended and deformed while decreasing this space. Then, the stress is efficiently and concentratedly transmitted from the mutually contacting portions of the gland packings, and the stem 5 and the inner wall surface of the stuffing box 6 are sealed. In this case, the tightening face pressure as applied by the packing holder is efficiently transmitted to the gland packings 1. Therefore, all the gland packings 1 have stress-concentrated points, especially in the above contacting portions. Especially, as is shown in FIG. 5(a) and FIG. 6(a), when all the present invention gland packings are, as mentioned above, equipped in alternate orientation, the sealing effect as a whole is a multistagewise sealing effect, and the extremely excellent sealability is displayed. In addition, in FIG. 5(a) and FIG. 6(a), all the present invention gland packings are equipped in alternate orientation. Therefore, the above contacting portions, namely, the portions where the flat portions of the present invention gland packings contact with each other, are extremely excellent stress-concentrated points at both sides of the inner diameter side and outer diameter side, and besides, the high sealability having substantially the same level can be displayed at any stress-concentrated point in the stuffing box almost without depending upon the distance from the packing holder 8. Usually, when conventional-type gland packings (e.g. gland packings of which the cross sectional shape is rectangular or quadrangular) were used, it was inevitable that the sealability is lowered as the distance from the packing holder 8 becomes farther. Therefore, as functions and effects of the present invention, this can be said to be one of particularly excellent effects together with the stress concentration of the above contacting portions.

As is shown in FIGS. 7 to 12, as mentioned above, preferred examples of the sealing apparatus comprising the present invention gland packing further include: a sealing structure in which adapter packings are equipped at the inner bottom portion 7 side and/or the packing holder 8 side in the stuffing box; and a sealing structure including a combination of the present invention gland packing and the conventional-type gland packing of which the cross sectional shape is rectangular.

Specifically, the adapter packing 10 and hard ring 10*b* favorably have high strength and high elasticity, and they are favorably made of metals or resins. The adapter packing 10 may be replaced with such as a conventional gland packing of which the cross sectional shape of a ring portion is rectangular, and packings having various material qualities may fitly be selected. In addition, when the adapter packing 10 is used at the inner bottom portion 7 side and/or the packing holder 8 side in the stuffing box is favorable in that effects (e.g. preventing protrusion (thrust) of the gland packing) can be obtained.

In addition, in the sealing apparatus comprising the present invention gland packing, a gland packing of which the shape is different from that of the present invention gland packing may fitly be used in combination therewith. Examples of the gland packing having such a different shape include the above-mentioned rectangular gland packings, but there is no especial limitation thereto. In addition, when only the present invention gland packings are used as gland packings in the sealing apparatus comprising the present invention gland packing, at least unless all the present invention gland packings are equipped in such a manner that they are piled in the same orientation, then the effects of the present invention can be displayed.

In the sealing apparatus comprising the present invention gland packing, preferred examples of its form include a form in which the equipped gland packings are such that the present invention gland packings and the rectangular gland packings are alternately equipped in order. The most favorable examples thereof include a form of the alternating equipment such that the equipped gland packings are as shown in FIG. 5(*a*) or FIG. 6(*a*), namely, a form in which all the equipped gland packings are equipped in such a manner that the orientations of the slopes of the other two edges of each gland packing are different from those of its neighboring gland packing.

The sealing apparatus comprising the present invention gland packing can be used for what has a sealing portion structure of any type such as so-called standard type or lantern-ring type, although there is no especial limitation thereto. Furthermore, although not especially limited, specifically utilizable examples favorably include: pumps, such as rotary pumps and reciprocating pumps; valves, such as gate valves and glove valves; and various stirring machines.

While retaining the above-mentioned characters, the present invention gland packing 1 can favorably be provided with various structural changes (changes in shape) as shown below, and can be used for the present invention sealing apparatus. In addition, the sealing apparatus can also favorably be provided with various structural changes (changes in shape). In these, there are also included those which come to have more excellent characters due to the structural changes.

There is no especial limitation on the above structural changes, but, as to the aforementioned gland packing 1, preferred examples include those which are provided with arch-shaped (arc-shaped) portions as shown in FIGS. 13(*a*) and (*b*) when taking note of the edges 1*a* and 1*b* that cross the axis 2*b*, perpendicular to the central axis 2*a*, at angles in the same direction in the cross sectional shape of the gland packing 1 as shown in FIG. 2(*a*). Similarly, as to the aforementioned sealing apparatus (e.g. stuffing box or packing holder), examples include those in which a slope is provided to the inner bottom portion 7 of the stuffing box or to a pressurizing face 8*a* of the packing holder. As to these structural changes, all the above portions that are taken note of may be either changed or not, and they may fitly be combined. In addition, the above structural changes may be applied either alone respectively or in combinations with each other.

Detailed Description of Preferred Embodiments

Hereinafter, the present invention is more specifically illustrated by the following examples of some preferred embodiments. However, the present invention is not limited to these examples. Incidentally, hereinafter, the unit "part(s) by weight" may simply be referred to as "part(s)" for the sake of convenience.

EXAMPLE 1

As a major raw material, an expanded graphite tape was prepared by slitting an expanded graphite sheet into strips having a width of 15 mm, and this tape was curly rolled. Thereafter, the resultant rolled material was compression-molded with a mold, thus obtaining a graphite gland packing of Example 1 (packing inner diameter: 20 mm, packing outer diameter: 33 mm, outer-diameter-side thickness: 6.5 mm, angles α and β as shown in FIG. 2(*a*) or (*b*): 5° and 5° respectively, width A: 0.15 t, width B: 0.15 t, and density: 1.70 g/cm$^3$) (hereinafter, referred to as a gland packing (1)). Herein, the above "outer-diameter-side thickness" means the length of the edge 1*d* as shown in FIG. 2(*a*) or (*b*).

Four rings of these gland packings (1) were equipped to a sealing apparatus as shown in FIG. 16 (hereinafter, referred to as a sealability-testing apparatus), and then the sealability was evaluated.

The sealability-testing apparatus comprises: an upper receptacle having such as a stem (driving shaft) 15, a stuffing box 6, and a packing holder 8; and a lower receptacle that is incorporated with this upper receptacle by tightening bolts 12 through an O-ring 11. The lower receptacle is provided with the following: a pressurizing opening 13 in order to inject nitrogen gas; a gas-enclosing portion 16; and bearings 14 and thrust bearings 17 in order to rotate the stem (driving shaft) 15. The gland packings (4 rings) as used for the sealability test are equipped between the inner bottom portion 7 side of the stuffing box and the pressurizing face 8*a* of the packing holder. Then, the inner wall surface of the stuffing box 6 and the surface of the stem (driving shaft) 15 are sealed by tightening the packing holder 8. Incidentally, the gland packings (1) were equipped in a pattern having the orientation as shown in FIG. 5(*a*) and FIG. 16.

When the sealability test is carried out, nitrogen gas was used as a fluid that was sealed in the gas-enclosing portion 16 in the sealability-testing apparatus, and that was an object of sealing. The nitrogen gas is injected from the pressurizing opening 13 into the gas-enclosing portion 16 so that the gas pressure will be constantly 10 MPa. While this gas pressure is maintained, the entire sealability-testing apparatus was immersed into water. The tightening face pressure of the packing holder 8 was stepwise increased 5 MPa by 5 MPa from 0 MPa to 45 MPa, and the sealability was tested every step in turn. The judgment of whether the sealability was achieved or not was made on the basis of the leaking rate of the nitrogen gas in water. When this value was less than $5.0 \times 10^{-5}$ Pa·m³/s was regarded as when the sealing was achieved. The "tightening face pressure" under which the sealing of nitrogen gas was achieved in this way was recorded to measure the "strain ratio" and "axis resistance per contact area". The results are shown in Table 1. Incidentally, the leakage of the nitrogen gas was not observed at all except in the stuffing box 6. As to the measurement of the aforementioned leaking rate, the leaked nitrogen gas is recovered by replacement above the water (about 3 minutes), and the leaking rate is calculated from the recovered volume and the recovering time.

In addition, the measurement methods of the tightening face pressure, strain ratio, and axis resistance per contact area are shown below.

Tightening face pressure (MPa):

This is a tightening load per projective (unit) area of the gland packing as viewed in the direction of the central axis when the aforementioned sealing of nitrogen gas is achieved.

Strain ratio (%):

This is a ratio at which the equipping length of the gland packings in the direction of the axis (length of from the pressurizing face of the packing holder to the inner bottom portion of the stuffing box) decreases from before tightening till the aforementioned sealing of nitrogen gas is achieved after tightening. Specifically, when the equipping lengths of the gland packings in the direction of the axis before and after the tightening are regarded as L and l respectively, then the strain ratio (%) can be calculated from the following equation: "strain ratio (%)=(L−1)/L×100".

Axis resistance per contact area (N/mm²):

This is a value obtained in the following way: the axis resistance (namely, force (load) necessary for rotating the axis) under which the aforementioned sealing of nitrogen gas is achieved is measured by a torque wrench, and the resultant measured value is divided by the apparent contact area that is obtained by multiplying the equipping length 1 after the tightening of the gland packing by the axis circumference.

EXAMPLES 2 to 4

Graphite gland packings of Examples 2 to 4 (hereinafter, referred to as gland packings (2) to (4)) were obtained by repeating the same procedures as of Example 1 except that the angles α and β and the widths A and B, as adjusted in Example 1, were changed as shown in Table 1. In addition, the same evaluations of the sealability as of Example 1 were carried out. The results are shown in Table 1.

Comparative Example 1

A graphite gland packing of Comparative Example 1 (of which the cross sectional shape is rectangular) (hereinafter, referred to as comparative gland packing (1)) was obtained by repeating the same procedure as of Example 1 except that the angle α, the angle β, and the outer-diameter-side thickness (similarly, also inner-diameter-side thickness) were changed to 0°, 0°, and 6.5 mm respectively. In addition, the same evaluation of the sealability as of Example 1 was carried out. The results are shown in Table 1.

TABLE 1

|  | Example 1 | Example 2 | Example 3 | Example 4 | Comparative Example 1 |
|---|---|---|---|---|---|
| α | 5 | 10 | 20 | 30 | 0 |
| β | 5 | 10 | 30 | 20 | 0 |
| α−β | 0 | 0 | −10 | 10 | 0 |
| A/t | 0.15 | 0.15 | 0.15 | 0.15 | — |
| B/t | 0.15 | 0.15 | 0.15 | 0.15 | — |
| Density of packing (g/cm³) | 1.70 | 1.70 | 1.70 | 1.70 | 1.70 |
| Tightening face pressure (MPa) | 25 | 20 | 15 | 20 | 35 |
| Strain ratio (%) | 2 | 20 | 30 | 32 | 17 |
| Axis resistance per contact area (N/mm²) | 1.62 | 0.87 | 0.80 | 1.39 | 2.34 |

From the results as shown in Table 1, it is understood that: in any of cases where the present invention gland packings of Examples 1 to 4 are used, gas can be sealed under a lower tightening face pressure than that of the conventional rectangular gland packing of Comparative Example 1. Therefore, the present invention gland packings of Examples 1 to 4 can be applied safely and can display sufficient sealability, even in a portion to which a very high load cannot be applied. In this way, even if the tightening face pressure is low, the present invention gland packing can achieve sufficient sealing, and it is understood that the axis resistance can also be lowered as a result accompanying this. Accordingly, when the present invention glad packing is applied to such as a valve, the hand torque necessary for opening or shutting it is greatly decreased. Above all, it is favorable to usually use the present invention gland packing for portions where the axis is said to usually be moved so frequently that apparatuses and gland packings are remarkably deteriorated by seal abrasion. Similarly, because a low tightening face pressure is enough, it can be said that: the equipment and tightening are easily carried out, and no large power is necessary even for retaining the tightened state, and the handling property is very excellent. In addition, the compactness of the entire sealing apparatus can also be achieved.

In this way, the following simulation was carried out in order to directly explain, from an aspect of the functional mechanism, that such as the sealability of the present invention gland packing is remarkably superior to that of the conventional gland packing (of which the cross sectional shape is rectangular).

That is to say, modeled as to the gland packing (3) and the comparative gland packing (1) were sealing apparatuses comprising 4 rings in total each of both gland packings in the form as shown in FIG. 5(*a*), and the transmitted face pressures (MPa) to the inner-diameter-side and outer-diameter-side seal faces were determined by the following detailed simulations. Herein, simulated as to the gland packing (3) was a case where sealing was carried out under a tightening face pressure of 20 MPa, and simulated as to the comparative gland packing (1) were cases where sealing was carried out under tightening face pressures of 20 MPa and 45 MPa respectively.

When the above simulations were carried out, the transmitted face pressures to the inner-diameter-side and outer-diameter-side seal faces were determined by finite-element analysis (FEA) in a state where the gland packings ware equipped to the sealing apparatus and tightened, wherein the transmitted face pressures were caused by the tightening face pressure. The method of axis-symmetrical elasticity calculation was applied to the finite-element analysis (FEA), and then portions other than the gland packing (e.g. the axis, stuffing box, and packing holder) were made of rigid bodies. There were a coefficient of friction, Young's modulus, Poisson's ratio, density, and number of elements as material constants of the gland packing. These values were set by making reference to such as a strain ratio, righting ratio, and change of measurements per one ring of the gland packing, and values in literature. Specifically, the coefficient of friction, Young's modulus, Poisson's ratio, and density were set at 0.3, 117.68 MPa, 0.3, and 1.70 g/cm$^3$ respectively. The number of elements was set at 400 relative to the entire gland packings (4 rings) as equipped.

Next, the "length distance" from the pressurizing face of the packing holder to the inner bottom portion of the stuffing box when the packing holder was tightened was regarded as "1", and then graphs were prepared as shown in FIGS. 14 and 15, in which the X axis is a length distance from the pressurizing face of the packing holder, and in which the Y axis is a "transmitted face pressure (MPa)" corresponding to this length distance. Incidentally, the transmitted face pressure from the outer diameter side of the gland packing to the inner wall surface of the stuffing box is shown in FIG. 14, and the transmitted face pressure from the inner diameter side to the axis (stem) surface is shown in FIG. 15.

From the results as shown in FIGS. 14 and 15, the following is understood. Specifically, the present invention gland packing has a stress-concentrated point where the tightening face pressure is high efficiently transmitted to both seal faces that are located at the inner and outer diameter sides. Therefore, when this gland packing is used for a sealing apparatus, there exist, for a definite tightening face pressure, at least two acutely peaking seal portions (seal portions having a large transmitted face pressure) which are superior when compared with cases where conventional-type gland packings (of which the cross sectional shapes are rectangular) are used. In addition, the peak sizes are on nearly the same level in any comparison of between the inner-diameter-side peaks, between the outer-diameter-side peaks, and between the inner-diameter-side peak and the outer-diameter-side peak, and stable peak values are shown irrespective of the distance from the tightening face or whether at the inner diameter side or at the outer diameter side. Accordingly, the efficient and multistagewise sealing synergistic effect can be displayed, and therefrom it is found that there is brought not only the excellent sealability as displayed at each peak portion, but also as a whole, sealing effects which are much more efficient and excellent than conventional.

INDUSTRIAL APPLICATION

The present invention can provide a novel gland packing and a sealing apparatus comprising this, wherein the gland packing displays high and stable sealability for a stem and an inner wall surface of a stuffing box even for uses further requesting the movability (rotation and reciprocating movement), and further, gives excellent effects, such as decrease of moving resistance of a stem, shape stability, adaptability to a corroded and worn-out stem and stuffing box, function for receiving shafts, easiness of equipment, simplification of sealing structure, and compactness of a sealing apparatus.

The invention claimed is:

1. A gland packing for a stuffing box, comprising a ring packing selected from the group consisting of knitted and plaited packings, laminated packings, graphite packings, and resin-molded packings and which can be elastically deformed by compression and has a quadrilateral cross sectional shape with inner and outer diameter sides and first and second sides extending between said inner and outer diameter sides,
   wherein said inner and outer diameter sides of the quadrilateral are parallel to a central axis of the gland packing, and wherein said first and second sides have slopes of the same orientation with respect to an axis perpendicular to the central axis,
   wherein:
   said inner-diameter-side has an acute angle portion and said outer-diameter-side has an acute angle portion of the quadrilateral being flat portions; and
   the slope angles of the first and second sides are less than 40° with respect to a plane perpendicular to the central axis.

2. A sealing apparatus, which is equipped with a plurality of gland packings that are piled in a stuffing box, and which seals the stuffing box,
   wherein:
   each of the gland packings is a gland packing having flat portions arranged at an inner-diameter-side acute angle portion and an outer-diameter-side acute angle portion of a ring packing, said gland packings being selected from the group consisting of knitted and plaited packings, laminated packings, graphite packings, and resin-molded packings and which can be elastically deformed by compression and has a quadrilateral cross sectional shape including: inner and outer diameter sides wherein said inner and outer diameter sides are parallel to a central axis of the gland packing; and first and second sides extending between said inner and outer diameter sides which have slopes of the same orientation with respect to a vertical axis perpendicular to the central axis;
   the slope angles of said first and second sides are less than 40° with respect to a plane perpendicular to the central axis; and
   at least one of the gland packings in the stuffing box is positioned therein in such a manner that the orientations of the slopes of the first and second sides of the at least one of the gland packings are different from the orientations of the slopes of the first and second sides of an adjacent gland packing.

3. A sealing apparatus according to claim 2, wherein all the gland packings in the stuffing box are positioned therein in such a manner that the orientations of the slopes of said first and second sides of each gland packing are different from those of its adjacent gland packing.

4. A sealing apparatus according to claim 2, which is further equipped with an adapter packing at an inner bottom portion side and/or a packing holder side in the stuffing box.

5. A sealing apparatus according to claim 3, which is further equipped with an adapter packing at an inner bottom portion side and/or a packing holder side in the stuffing box.

6. A gland packing, comprising a ring packing having an annular shape selected from the group consisting of knitted and plaited packings, laminated packings, graphite packings, and resin-molded packings and which can be elastically deformed by compression and where said gland packing has a quadrilateral cross sectional shape with inner and outer diameter sides and first and second sides extending between said inner and outer diameter sides, said inner and outer diameter sides being parallel to a central axis of the gland packing;

said first side having a first sloped surface at a first angle with respect to a plane perpendicular to the central axis;

said second side having a second sloped surface at a second angle with respect to the plane perpendicular to the central axis, wherein said first angle is different from said second angle and where said first and second angles are less than 40° with respect to a plane perpendicular to the central axis.

7. The gland packing of claim 6, wherein said first angle is less than said second angle.

8. The gland packing of claim 6, wherein said first angle is greater than said second angle.

9. The gland packing of claim 6, wherein said first side includes a first flat surface being substantially perpendicular to said inner diameter side and extending between said inner diameter side and said first sloped surface; and where said second side includes a second flat surface being substantially perpendicular to said outer diameter side and extending between said outer diameter side and said second sloped surface.

10. The gland packing of claim 6, wherein said first sloped surface of said first side intersects with said outer diameter side to define a first outer edge, and said second sloped surface of said second side intersects with said inner diameter side to define a first inner edge.

11. The gland packing of claim 10, wherein said first side has a first flat surface and said first outer edge is spaced from said first flat surface a first distance and where said first inner edge is spaced from said first flat surface a second distance that is greater than said first distance.

12. A sealing apparatus comprising a plurality of stacked gland packings in a stuffing box for sealing said stuffing box, wherein each of said gland packings comprises a ring packing having an annular shape selected from the group consisting of knitted and plaited packings, laminated packings, graphite packings, and resin-molded packings and which can be elastically deformed by compression and where said gland packing has a quadrilateral cross sectional shape with inner and outer diameter sides and first and second sides extending between said inner and outer diameter sides, said inner and outer diameter sides being parallel to a central axis of the gland packing;

said first side having a first sloped surface at a first angle with respect to a plane perpendicular to the central axis;

said second side having a second sloped surface at a second angle with respect to the plane perpendicular to the central axis, wherein said first angle is different from said second angle and where said first and second angles are less than 40° with respect to a plane perpendicular to the central axis.

13. The gland packing of claim 12, wherein said first angle is less than said second angle.

14. The gland packing of claim 12, wherein said first angle is greater than said second angle.

15. The gland packing of claim 12, wherein said first side includes a first flat surface being substantially perpendicular to said inner diameter side and extending between said inner diameter side and said first sloped surface; and where said second side includes a second flat surface being substantially perpendicular to said outer diameter side and extending between said outer diameter side and said second sloped surface.

16. The gland packing of claim 12, wherein said first sloped surface of said first side intersects with said outer diameter side to define a first outer edge, and said second sloped surface of said second side intersects with said inner diameter side to define a first inner edge.

17. The gland packing of claim 16, wherein said first side has a first flat surface and said first outer edge is spaced from said first flat surface a first distance and where said first inner edge is spaced from said first flat surface a second distance that is greater than said first distance.

* * * * *